United States Patent [19]

Holt et al.

[11] 3,726,958
[45] Apr. 10, 1973

[54] REDUCTION OF SO$_2$ IN GAS MIXTURES

[75] Inventors: Eugene L. Holt, Elmhurst, N.Y.; Albert B. Welty, Jr., Westfield, N.J.

[73] Assignee: Esso-Research and Engineering Company, Linden, N.J.

[22] Filed: Feb. 22, 1971

[21] Appl. No.: 117,628

[52] U.S. Cl. ................423/243, 423/564, 423/570
[51] Int. Cl. ..............................................C01b 17/04
[58] Field of Search.......................23/225, 226, 181; 260/683.3, 669; 423/243, 564, 569

[56] References Cited

UNITED STATES PATENTS

| | | | |
|---|---|---|---|
| 3,495,941 | 7/1970 | Van Helden | 23/226 |
| 2,867,677 | 1/1959 | Murray | 23/225 X |
| 3,585,248 | 6/1971 | Pasternak et al. | 260/669 |
| 3,451,923 | 6/1969 | Welty et al. | 23/225 P |

*Primary Examiner*—G. O. Peters
*Attorney*—Pearlman & Schlager and Louis F. Kreek

[57] ABSTRACT

A sulfur dioxide-rich off gas stream obtained, as for example, by regeneration of a flue gas desulfurization sorbent, is treated with a hydrocarbon oil in the liquid phase at a temperature of about 250 F. to about 800°F. in order to reduce the sulfur dioxide. The hydrocarbon oil is preferably an inexpensive refinery stream, e.g., gas oil, catalytic cycle stock, or residuum. Hydrogen sulfide formed in the reduction can be reacted with a further quantity of sulfur dioxide to form elemental sulfur. At least a portion of the hydrocarbon oil after reaction with sulfur dioxide may be burned in a furnace in which flue gas containing sulfur dioxide is formed.

9 Claims, 1 Drawing Figure

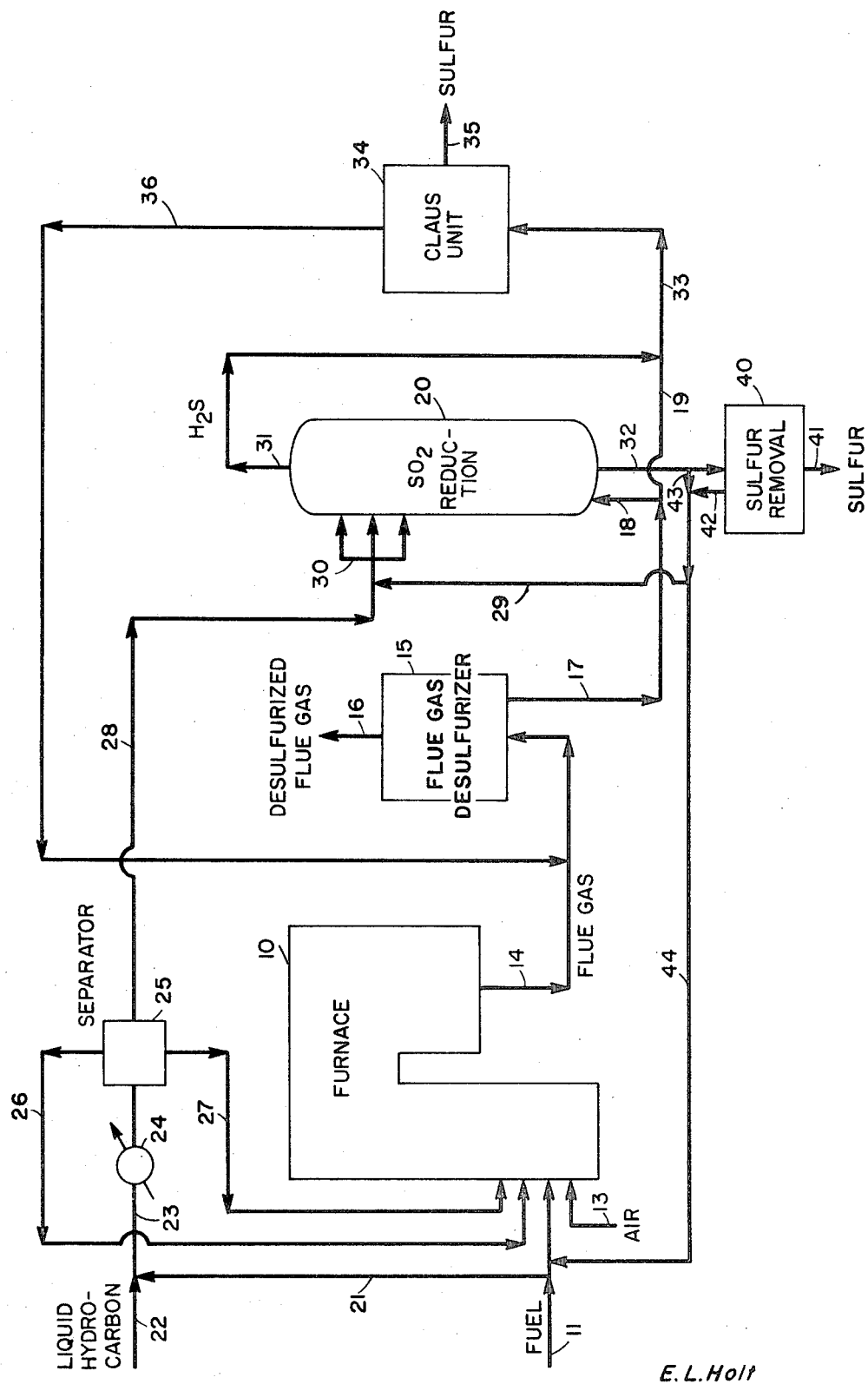

3,726,958

REDUCTION OF SO₂ IN GAS MIXTURES

BACKGROUND OF THE INVENTION

This invention relates to processes for removing sulfur dioxide from flue gas, and more particularly to processes in which a sulfur dioxide-rich off gas stream obtained in a flue gas desulfurization process is treated in order to convert the sulfur dioxide content thereof to elemental sulfur. Sulfur dioxide pollution of the atmosphere has become a major problem, especially in urban areas. The harmful effects of sulfur dioxide on plant and animal life, and on human beings, are well known. The presence of sulfur dioxide in the atmosphere is due primarily to the combustion of fossil fuels, i.e., coal and oil, which contain sulfur. Electric power plants constitute a major source of sulfur dioxide pollution of the atmosphere.

Various processes for removing sulfur dioxide from flue gas are known in the art. These may employ either a solid sorbent, such as supported metal or metal oxide, or a liquid sorbent, such as an aqueous ammoniacal solution. Representative processes using solid sorbents include those des-cribed in U.S. Pat. Nos. 3,411,865 and 3,501,897, and in British Pat. No. 1,089,716. Representative processes employing aqueous absorbents are shown and described in U.S. Pat. Nos. 2,134,481 and 3,477,815. All of these processes have one characteristic in common: they are regenerative processes which produce a sulfur dioxide-rich off gas stream as well as a desulfurized flue gas stream. The term "sulfur dioxide-rich off gas stream" in the present specification denotes a gas stream having a substantially greater sulfur dioxide concentration than the original flue gas stream. The off gas stream in most cases will have a sulfur dioxide content of more than 2 percent by volume, and usually more than about 5 percent by volume.

It has been proposed in the art to treat off gas streams in order to convert the sulfur dioxide content thereof either to sulfuric acid or to elemental sulfur. In many instances elemental sulfur is the more attractive, since this material can be readily stored and can be shipped economically over much greater distances than sulfuric acid. The present process provides a convenient means for reducing by-product sulfur dioxide from a flue gas desulfurization process to elemental sulfur. A significant advantage of the present process is that the reducing agent is an inexpensive, heavy, fuel grade hydrocarbon which is suitable for burning in the steam boiler of an electric power plant.

SUMMARY OF THE INVENTION

According to the present invention, a gas stream containing sulfur dioxide is contacted in a reduction zone with a hydrocarbon oil in the liquid phase in the presence of a catalyst at a temperature of about 250°F. to about 800°F. The hydrogen sulfide formed in the reduction zone is reacted with additional sulfur dioxide to form elemental sulfur. At least a portion of the hydrocarbon effluent from the reduction zone is burned in a furnace or boiler in which a flue gas containing sulfur dioxide is formed.

THE DRAWING

The sole FIGURE of the drawing is a flow sheet of the process.

DESCRIPTION OF THE PREFERRED EMBODIMENT

The gas stream containing sulfur dioxide which is treated according to the present invention is preferably a sulfur dioxide-rich off gas stream obtained in a flue gas desulfurization process, such as the processes described in the previously mentioned U.S. Pat. Nos. 2,134,481; 3,411,865; 3,477,815; and 3,501,897, and in British Pat. No. 1,089,716. The flue gas may be formed by combustion of coal or oil in a conventional furnace, such as an electric power generating furnace or boiler. The sulfur dioxide content of the flue gas depends on the sulfur content of the furnace fuel, and is typically about 0.2–0.3 percent by volume.

The $SO_2$-rich off gas stream will usually contain at least about 2 percent by volume of sulfur dioxide, and typically at least about 5 percent by volume of sulfur dioxide diluted with other gases. The gas stream preferably is substantially free of oxygen, since oxygen in the gas stream consumes the hydrocarbon reducing agent unproductively and often leads to undesirable side reactions such as the formation of sulfur acids which are not easily recoverable. Use of a flue gas desulfurization process which yields an essentially oxygen-free off gas stream is therefore recommended. However, the presence of nonoxidizing diluents in the gas stream, such as hydrogen, vapor phase hydrocarbons, nitrogen and water vapor, is not harmful. In fact, the presence of water vapor actually appears to be beneficial as will be explained subsequently. The content of the off gas stream depends on the type of sorbent and the regeneration procedure. The off gas in the process of British Pat. No. 1,089,716, for example, contains reducing gas (e.g., hydrogen or methane), water vapor and sulfur dioxide. On the other hand, the off gas in the process of U.S. Pat. No. 2,134,481 consists essentially of sulfur dioxide and water vapor.

A heavy hydrocarbon oil is used as the reducing agent according to this invention. This heavy hydrocarbon oil is a liquid at the specific reaction temperature (in the range of about 250°F. to about 800°F.) at which sulfur dioxide reduction is actually carried out, although it may be viscous, even semi-solid, at ambient temperature. Various inexpensive and readily available petroleum refinery fractions can be used for the reducing agent. Heavy residual fuel oil such as is used to fire boilers of power plants and other installations is ordinarily the cheapest and most readily available of all the refinery fractions which may be used in the present process. Other readily available petroleum fractions and refinery stocks, such as virgin gas oils and cracked gas oils such as catalytic cycle oils (the oils which are recycled in a catalytic cracking process), are also highly desirable and readily available materials which can be used as reducing agents for sulfur dioxide. The heavy hydrocarbons are superior to light hydrocarbons, such as methane and ethane, as reducing agents for sulfur dioxide.

When the oil chosen for use as the reducing agent initially contains light hydrocarbons which are volatile at the sulfur dioxide reduction temperature, it is desirable to remove these constituents by suitable means such as fractionation. One example of such an oil is a mixture of residual oil and light distillate, the latter added to reduce viscosity, which is sometimes used as fuel in oil fired furnaces. The presence of light hydrocarbons in the overhead c from the sulfur dioxide reduction is detrimental because these hydrocarbons are in into carbonaceous materials which catalyst the product elemental sulfur. 43

When residual oils are used as reducing agents herein, it is desirable to remove the heaviest, asphaltenic components in order to prolong catalyst life. These can be removed as a bottoms fraction in conventional fractionation procedures.

The sulfur dioxide-rich off gas stream is contacted with the hydrocarbon oil in the liquid phase in a reduction zone in the presence of a solid catalyst at a temperature in the range of about 250°F. to about 800°F., and preferably at atmospheric pressure. Preferred temperatures are in the range of about 400°F. to about 750°F. When operating at temperatures about about 400°F., the sulfur dioxide is reduced primarily, and in many cases essentially quantitatively, to hydrogen sulfide. Little or no elemental sulfur is formed as a rule in this temperature range. The use of lower temperatures gives somewhat more elemental sulfur relative to the amount of hydrogen sulfide produced, which reduces the size of the unit necessary for converting hydrogen sulfide to elemental sulfur. The lower reaction temperatures also make it possible to use a more volatile hydrocarbon mixture. On the other hand, the reduction rate of sulfur dioxide is lower at the lower temperatures. On balance, temperatures of about 400°F. or higher are generally preferred over lower temperatures. The hydrocarbon oil is partially dehydrogenated in the reduction zone. Hydrogen and light hydrocarbons, when present in the sulfur dioxide-rich off gas stream, do not react to any significant extent in the reduction zone.

The reaction temperature should not be so high as to cause appreciable carbonization or cracking of the reducing agent. Temperatures above about 800°F. are ordinarily not used, and temperatures below about 750°F. are generally preferred.

The sulfur dioxide may be contacted with the hydrocarbon oil by any means giving good gas-liquid contact. Countercurrent contact in a tower which is packed with a solid catalyst is a preferred mode of operation.

The reduction of sulfur dioxide proceeds much more smoothly and completely in the presence of a suitable solid catalyst than in the absence of catalyst. The preferred catalyst is a material comprising alumina. Alumina powder has been found to be en excellent catalyst for this reaction; bauxite and other alumina-containing materials may be used instead of pure alumina if desired. The reaction between sulfur dioxide and the reducing agent has been found to occur even when the absence of a catalust where water vapor is present in the incoming gas mixture, while substantially no reaction was detected in the absence of either water vapor or a solid catalyst. Even where the incoming gas mixture contains water vapor, much better results are obtained using a catalyst.

Hydrogen sulfide produced in the reduction zone is removed overhead. The exit hydrogen sulfide is advantageously reacted with additional sulfur dioxide-rich off gas stream in approximately the stoichiometric proportions for the formation of elemental sulfur. This reaction is the well-known Claus reaction and may be carried out according to conditions known in the art. The presence of light hydrocarbons in the reduction zone overhead is undesirable, since these will form solid carbonaceous substances which contaminate the product sulfur in the Claus plant. The presence of such hydrocarbons is avoided by using as the reducing agent a hydrocarbon oil which does not contain substantial amounts of hydrocarbons which are volatile at sulfur dioxide reduction temperature as already explained.

Elemental sulfur which is produced in the reduction step is a liquid at usual reaction conditions. This sulfur dissolves to some extent in the hydrocarbon oil and the excess is a liquid which is immiscible with the hydrocarbon oil. The mixture of hydrocarbon oil and sulfur is withdrawn from the reaction zone and the immiscible sulfur layer is separated. At least a portion of the partially dehydrogenated hydrocarbon oil, after removal of immiscible sulfur, may be burned in the furnace in which flue gas is generated. A second portion of the partially dehydrogenated oil is recycled back to the reduction zone. The dissolved and chemically combined sulfur in the portion which is burned will be converted in the furnace to sulfur dioxide, which is removed in the flue gas desulfurizer. Since a low cost oil is used in this process, combustion of a portion thereof is a convenient and inexpensive way to recover the dissolved and combined sulfur therein. Recycling of a portion of the oil is preferable to once-through operation because it reduces the amount of oil which must be supplied to the reduction zone, gives a greater liquid flow rate in the reduction zone and reduces the amount of sulfur recycled to the furnace.

This invention will now be described further with reference to the sole FIGURE of the drawing, which illustrates a preferred embodiment of the process.

Referring now to the drawing, 10 is a furnace in which a carbonaceous liquid or solid fuel containing chemically combined sulfur is burned with air, forming a fluid gas stream which contains sulfur dioxide. Liquid fuels will be used for purposes of illustration. A heavy hydrocarbon oil as aforedescribed is supplied through supply conduit 11. Very viscous oils can be preheated, usually to about 200° to about 400°F. The major portion of this fuel oil is introduced into furnace 10 through fuel inlet 12. Preheated air for combustion is introduced into furnace 10 through air inlet 13. Combustion of fuel in furnace 10 produces a flue gas containing sulfur dioxide, typically in an amount of about 0.2–0.3 percent by volume which is discharged through flue gas line 14.

The flue gas in line 14 flows into a flue gas desulfurizer 15, which may be an apparatus for removing sulfur dioxide from flue gas using either a solid sorbent or an aqueous liquid absorbent solution. The apparatus shown in any of the Nos. U.S. Pat. No. 2,134,481; 3,477,815 and 3,501,897 can be used, for example. Desulfurized flue gas is discharged from the desulfurizer 15 through an outlet 16, and a sulfur dioxide-rich off gas stream is discharged into line 17. The sulfur dioxide-rich off gas stream in line 17 is split into a major stream in line 18 and a minor stream in by-pass line 19. The major stream in line 18 is introduced into a tower 20 which contains a bed of a suitable catalyst such as alumina. The sulfur dioxide-containing gas countercurrently contacts a heavy hydrocarbon oil in the liquid phase at a temperature of about 250°F. to about 800°F. in tower 20.

The hydrocarbon oil feed to tower 20 comprises a mixture of the fresh liquid fuel from line 11 and recycle material. A minor portion of the oil flow in line 11 is diverted into branch conduit 21. Where the fuel fed to furnace 10 is a solid, such as powdered coal, then line 21 is omitted and the fresh liquid hydrocarbon feed for sulfur dioxide reduction is supplied through an auxiliary fuel line 22. The liquid hydrocarbon from either line 21 or line 22 flows into line 23. The hydrocarbon therein is heated or cooled as required in heat exchanger 24 so that undesirable hydrocarbon volatiles can be removed and n order to provide the prefered reaction temperature in tower 20. Generally, this stream in line 23 is heated since the sulfur dioxide reduction temperature will usually be higher than the temperature of the preheated oil in line 11 (about 200°-400°F.)or of the oil in line 22. Where heating in heat exchanger 24 causes the formation of vapor, which is usually the case, it is necessary to separate this vapor from the process stream. It is also desirable to separate heavy, nonvolatile residual oil fractions from the process stream. The process stream after leaving heat exchanger 24 is introduced into separator 25, which may be any desired equipment such as a fractionator. The vapor phase is withdrawn through vapor overhead line 26 and is returned to furnace 10 where it is burned. A heavy residual oil fraction may be withdrawn where necessary through bottoms line 27 and returned to the furnace 10 where it is burned. An intermediate fraction is withdrawn from separator 25 through sidestream line 28.

The fresh liquid hydrocarbon feed in line 28 is mixed with recycled material in line 29. The resulting mixture flows into a manifold 30 which preferably includes a plurality of distributors at vertically spaced locations in tower 20. The sulfur dioxide reacts with a portion of the hydrocarbon oil in tower 20, reducing the sulfur dioxide and partially dehydrogenating the hydrocarbon oil. A product gas containing hydrogen sulfide and water vapor is withdrawn product outlet line 32. This bottoms product stream may also contain some elemental sulfur in the liquid state.

The hydrogen sulfide-containing overheat product in line 31 is mixed with sulfur dioxide-containing gas in bypass line 19 to form a gas mixture containing both hydrogen sulfide streams 19 and 31 should be proportioned so that the $H_2S:SO_2$ mole ratio in stream 33 is slightly less than 2:1. The gas mixture in conduit 33 is introduced into a Claus unit 34, where the hydrogen sulfide and sulfur dioxide are reacted in the presence of a suitable catalyst to form elemental sulfur. This reaction may be carried out according to conventional Claus reaction techniques. Elemental sulfur is withdrawn as a product through line 35, an an off gas containing water vapor and a small amount of sulfur dioxide in withdrawn overhead through line 36. The Claus unit 34 should be operated with a slight excess of sulfur dioxide according to known practice in order to prevent the presence of unreacted hydrogen sulfide in the gaseous overhead line 36. The gas in line 36 is admixed with the sulfur dioxide-containing flue gas in unreacted is returned to the flue gas desulfurizer 15.

Sulfur when present in the hydrocarbon stream in line 32 is separated therefrom in decanter 40. Since liquid sulfur is not completely miscible with the hydrocarbon, the excess, not dissolved, may be removed by conventional decantation. Sulfur is withdrawn through line 14. The decanted hydrocarbon is withdrawn through line 42. Where there is substantially decanter 40 can be omitted and the hydrocarbon in that case flows directly into bypass line 43. A portion of the hydrocarbon to manifold 30 at the upper end of the sulfur dioxide reduction tower 20. Recycle assures an adequate amount of liquid phase in tower 20 for reaction with sulfur dioxide, and also minimizes the amount of combined and dissolved sulfur going back to the furnace 10. The remainder of the hydrocarbon oil in line 42 or 43 passes through return line 44 back to furnace 10 and is introduced into the furnace through the fuel manifold 12 downstream of branch conduit 21.

The catalyst in tower 20 can be periodically regenerated with air as required to remove carbonaceous deposits. Flow lines used only during regeneration have been omitted from the drawing for the sake of clarity.

This invention will now be described with reference to specific embodiments thereof illustrated by the following examples.

EXAMPLE 1

A mixture of 6 cc/min. of $SO_2$ and 114 cc/min. of nitrogen (total flow rate: 120 cc/min.; composition: $SO_2$, 5 percent by volume; nitrogen, 95 percent by volume) was bubbled through 500 cc of catalytic recycle gas oil maintained in a reflux system at 500°F. Initially no hydrogen sulfide was produced. Then 25 cc of powdered alumina was added to the gas oil. In 2 to 5 minutes thereafter, 33 percent of the sulfur in the exit gas stream was in the form of hydrogen sulfide, the remainder as sulfur dioxide. Conversion of sulfur dioxide to hydrogen sulfide increased with the passage of time. After 7–10 minutes the conversion was 47 percent, and at 12–15 minutes, the conversion was 100 percent.

EXAMPLE 2

A gas mixture of sulfur dioxide, water vapor, and nitrogen was bubbled through catalytic recycle gas oil similar to that in Example 1 in a reflux system at 600°F. The gas mixture was introduced at a rate of about 25 cc/min. of $SO_2$, 4 cc/min. of water vapor, and 114 cc/min. of nitrogen, corresponding to a total flow of 143 cc/min. and a composition, and 79.7 percent nitrogen. Initially there was no catalyst in the system. During this period, conversion of $SO_2$ to $H_2S$ dropped with time. At 3–6 minutes after startup, 62 percent of the incoming $SO_2$ was converted to $H_2S$; at 14–17 minutes conversion was 56 percent; at 25–28 minutes, conversion was only 18 percent. Alumina powder (approximately 25 cc) was then added, and thereafter the consion increased with time. Within 1–4 minutes after addition of alumina powder, conversion was 37.5 percent; at 13–16 minutes, conversion was 72 percent.

The above examples show that sulfur dioxide is efficiently reduced by a heavy hydrocarbon oil, in these case cat cycle oil, in the presence of a catalyst. Hydrogen sulfide was the principal reduction product at the temperatures used in these examples; in fact, quantitative conversion of $SO_2$ to $H_2S$ was achieved in Example 1. The concentrations of $SO_2$ are typical of those in off gases from flue gas desulfurization processes.

Treatment of a sulfur dioxide-rich off gas stream according to the present invention is preferable to treatment of flue gas for at least two reasons. First, a much larger $SO_2$ reduction unit would be required if flue gas were used, because of the larger gas volumes. Second, the oxygen present in flue gas would cause undesirable side reactions in the sulfur dioxide reduciion unit as already explained.

The present invention provides a simple and economical process for converting sulfur dioxide from flue gas desulfurization processes into elemental sulfur.

What is claimed is:

1. In a process for desulfurizing a flue gas in which a carbonaceous fuel containing sulfur is burned in a furnace, thereby producing a flue gas containing $SO_2$ and in which said flue gas is desulfurized with the formation of a flue gas exit stream of substantially reduced $SO_2$ content and an $SO_2$-rich off gas stream of substantially greater $SO_2$ content than said flue gas stream, the improvement comprising contacting said $SO_2$-rich off gas stream with a hydrocarbon oil in the liquid phase in the presence of a catalyst in a redution zone at a temperature of about 250°F. to about 800°F., said hydrocarbon oil being a heavy hydrocarbon fraction at the reaction temperature, thereby reducing said sulfur dioxide.

2. A process according to claim 1 in which said liquid hydrocarbon fraction has an initial boiling point of not less than about 250°F.

3. A process according to claim 1 in which said sulfur dioxide is reduced to hydrogen sulfide.

4. A process according to claim 1 in which said catalyst is a solid catalyst.

5. A process according to claim 4 in which said catalyst comprises alumina.

6. A process according to claim 1 in which said $SO_2$-rich off gas stream contains water vapor.

7. In a process for desulfurizing a flue gas in which a carbonaceous fuel containing sulfur is burned in a furnace, thereby producing a flue gas containing $SO_2$ and in which said flue gas is desulfurized with the formation of a flue gas exit stream of substantially reduced $SO_2$ content and an essentially oxygen-free $SO_2$-rich off gas stream which contains water vapor and which has a substantially greater $SO_2$ content than said flue gas stream, the improvement comprising contacting said $SO_2$-rich and water vapor-containing off gas stream with a hydrocarbon oil in the liquid phase in a reduction zone at a temperature of about 250° to about 800°F., said hydrocarbon oil being a heavy hydrocarbon fraction at the reaction temperature, thereby reducing said sulfur dioxide.

8. A process according to claim 7 in which said off-gas stream is contacted with said hydrocarbon in the presence of a solid catalyst.

9. A process acording to claim 8 in whlch said catalyst is alumina.

* * * * *